G. G. WOLFE.

Reservoir Cooking-Stoves.

No. 6,218. Reissued Jan. 12, 1875.

WITNESSES:

Jas. E. Hutchinson

John R. Young

INVENTOR.

Gordon G. Wolfe, by

Prindle and Deane, his attys

THE GRAPHIC CO. PHOTO-LITH. 39 & 41 PARK PLACE, N.Y.

UNITED STATES PATENT OFFICE.

GURDON G. WOLFE, OF TROY, NEW YORK.

IMPROVEMENT IN RESERVOIR COOKING-STOVES.

Specification forming part of Letters Patent No. 76,292, dated March 31, 1868; reissue No. 5,442, dated June 10, 1873; reissue No. 6,218, dated January 12, 1875; application filed January 28, 1874.

DIVISION B.

*To all whom it may concern:*

Be it known that I, GURDON G. WOLFE, of the city of Troy, in the county of Rensselaer and State of New York, did invent certain new and useful Improvements in Cooking-Stoves, for which Letters Patent No. 76,292 were issued to me upon the 31st day of March, 1868, and thereafter duly surrendered and reissued bearing date of June 10, 1873, and numbered 5,442, which reissued Letters Patent have been found defective, in that the specification and claims do not cover and embrace all of the original invention, as shown in the model and drawings filed in the Patent Office upon the 14th day of February, 1868.

Now, therefore, being desirous of reissuing said reissued Letters Patent, herewith surrendered, I have prepared, and do hereby declare that the following is a full, clear, and exact description of said invention, reference being had to the accompanying drawing making a part of this specification, in which—

Figure 1:
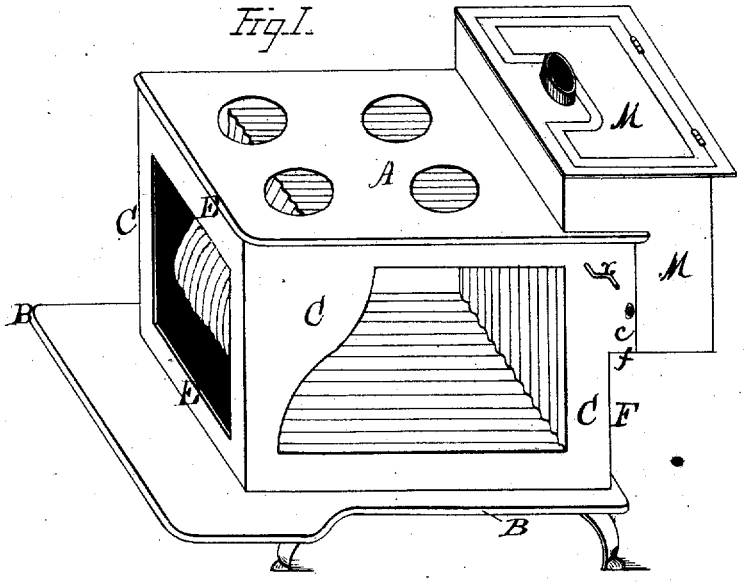
Figure 2:
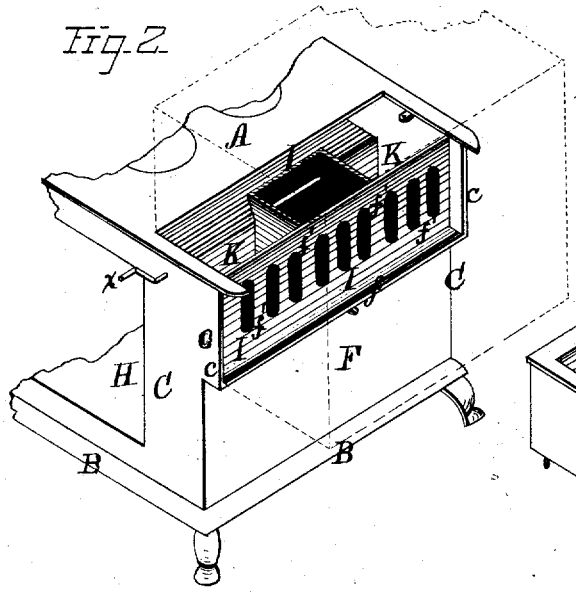
Figure 3:
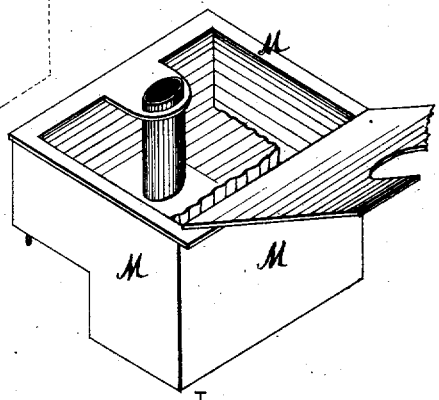

Figure 1 is a perspective view of a cooking-stove, having my improved reservoir attached to its rear end. Fig. 2 is a like view of the rear end of the said stove, said reservoir being detached so as to show the construction of the former at its points of contact with the latter, and Fig. 3 is a perspective view of said reservoir, its lid being opened so as to show the interior construction.

Letters of like name and kind refer to like parts in each of the figures.

The object of my invention is to enable a large percentage of the surplus heat of a cooking-stove to be utilized in the heating of water within a reservoir; and it consists, principally, in combining with a cooking-stove having rear vertical flues, and with a water-reservoir located in rear of the same, dampered openings formed in and through the back plate of said stove, by means of which, when desired, communication for the heated escaping products of combustion is effected between the descending flue or flues and the said reservoir.

It consists, further, in combining with a cooking-stove having rear descending and ascending flues, and with a water-reservoir located in rear of the same, dampered openings in and through the rear wall of said flues, by means of which communication for the heated gases of combustion can be opened and closed between the said descending and ascending flues and the said reservoir.

In the annexed drawings, A represents the top plate, B the bottom plate, C and C the side plates, E the front end plate, and F the rear end plate of a cooking-stove provided with a fuel-chamber, G, oven H, and the usual system of flues. At the rear end, and from about the vertical center of said stove upward, the side plates C and C are extended rearward, and a horizontal flange, *f*, is provided upon the plate F, which flange extends between the lower corners of the extended portions *c* of said side plates, and with the latter forms a recess, I, that is open to the rear, and by means of suitable openings *f′ f′* communicates with the descending and ascending flues K and L, respectively. Against the rear end of the stove is placed a reservoir, M, which incloses the rear side of the recess I and, preferably, extends over upon the top of said stove, although such arrangement is not essential to this portion of my invention.

The opening *f′ f′* are closed, when desired, by means of dampers, when the operation of parts is as follows: When the apertures *f′* are opened the heated escaping products of combustion, from the flues K and L, impinge directly against the water-reservoir M, and thus impart to the contents of the latter a large percentage of their heat. When said dampered openings *f′* are closed, direct contact between said gaseous products of combustion and said reservoir is cut off, and the latter receives such heat only as is radiated from the rear wall of said vertical flues.

The arrangement shown enables the water within a reservoir to be heated with more or less rapidity, as occasion requires, enables a large percentage of the surplus heat to be thus economized, and does not interfere with the perfect operation of the oven.

Having thus fully set forth the nature and merits of my invention, what I claim as new is—

1. In combination with a cooking-stove having rear vertical flues, and with a water-reservoir located in rear of the same, dampered openings formed in and through the back plate of said stove by means of which, when desired, communication for the heated escaping products of combustion is effected between the descending flue or flues and said reservoir.

2. In combination with a cooking-stove having rear descending and ascending flues, and with a water-reservoir located in rear of the same, dampered openings in and through the rear wall of said flues by means of which communication for the heated gases of combustion can be opened and closed between the said descending and ascending flues and the said reservoir.

In testimony whereof I have hereunto set my hand this 24th day January, 1874.

GURDON G. WOLFE.

Witnesses:

WILLIAM TOUGH,

NELSON PRAMER.